(12) United States Patent
Thau

(10) Patent No.: US 6,336,737 B1
(45) Date of Patent: *Jan. 8, 2002

(54) MODULAR EXTERIOR REARVIEW MIRROR ASSEMBLY

(75) Inventor: Wolfgang Thau, Gevelsberg (DE)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/706,038

(22) Filed: Nov. 3, 2000

Related U.S. Application Data

(63) Continuation of application No. 09/420,117, filed on Oct. 18, 1999, now Pat. No. 6,146,003, and a continuation of application No. 08/978,593, filed on Nov. 25, 1997, now Pat. No. 6,007,222.

(30) Foreign Application Priority Data

Nov. 29, 1996 (DE) ..................... 296 20 775 U

(51) Int. Cl.⁷ ......................................... F21W 101/12
(52) U.S. Cl. ...................................... 362/494
(58) Field of Search ........................... 362/494; 439/34, 439/36; 248/476, 479, 900; 359/839, 872, 841

(56) References Cited

U.S. PATENT DOCUMENTS

| | | | |
|---|---|---|---|
| 4,274,078 A | 6/1981 | Isobe et al. | 340/98 |
| 4,475,100 A | 10/1984 | Duh | 340/98 |
| 4,646,210 A | 2/1987 | Skogler et al. | 362/142 |
| 4,733,336 A | 3/1988 | Skogler et al. | 362/142 |
| 4,807,096 A | 2/1989 | Skogler et al. | 362/142 |
| 4,809,137 A | 2/1989 | Yamada | 362/61 |
| 4,890,907 A | 1/1990 | Vu et al. | 350/605 |
| 4,916,430 A | 4/1990 | Vu et al. | 340/363 |
| 4,988,179 A | 1/1991 | Stensland | 350/637 |
| 5,014,167 A | 5/1991 | Roberts | 362/83.1 |

(List continued on next page.)

FOREIGN PATENT DOCUMENTS

| | | |
|---|---|---|
| DE | 2634372 A1 | 2/1978 |
| DE | 81 254 52 U | 12/1981 |
| DE | 3206526 A1 | 9/1983 |
| DE | 3641928 A1 | 11/1987 |
| DE | 3790327 C2 | 1/1988 |
| DE | 3635471 A1 | 4/1988 |
| DE | 3635473 A1 | 4/1988 |
| DE | 3803510 A | 9/1988 |
| DE | 3740485 A1 | 6/1989 |
| DE | 3923932 A1 | 1/1991 |

(List continued on next page.)

OTHER PUBLICATIONS

German Search Report for Utility Model Application No. 296 20 775.6.
Japanese Abstract of Patent No. 03050044, published Mar. 4, 1991.

Primary Examiner—Laura K. Tso
(74) Attorney, Agent, or Firm—Van Dyke, Gardner, Linn & Burkhart, LLP

(57) ABSTRACT

An exterior rearview mirror assembly for vehicles has a plurality of modules, preferably including at least two selected from a housing, a mirror element, an actuator, a mirror support, and a light module. The mirror element is preferably supported on and adjustable by the actuator module. The mirror support supports the actuator within the housing. The actuator preferably has a least one electrical drive motor for adjusting the mirror element within the housing. The modules are preferably joined together by plug-type connectors.

60 Claims, 2 Drawing Sheets

U.S. PATENT DOCUMENTS

| | | | |
|---|---|---|---|
| 5,017,903 A | 5/1991 | Krippelz, Sr. | 340/472 |
| 5,109,214 A | 4/1992 | Heidman, Jr. | 340/475 |
| 5,155,625 A | 10/1992 | Komatsu et al. | 359/512 |
| 5,170,288 A | 12/1992 | Imaizumi et al. | 359/507 |
| 5,178,448 A | 1/1993 | Adams et al. | 362/83.1 |
| 5,207,492 A | 5/1993 | Roberts | 362/30 |
| 5,245,480 A | 9/1993 | Polzer | 359/841 |
| 5,268,795 A | 12/1993 | Usami | 359/841 |
| 5,313,335 A | 5/1994 | Gray et al. | 359/839 |
| 5,353,190 A | 10/1994 | Nakayama et al. | 361/647 |
| 5,371,659 A | 12/1994 | Pastrick et al. | 362/83.1 |
| 5,475,530 A | 12/1995 | Fujie et al. | 359/512 |
| 5,497,305 A | 3/1996 | Pastrick et al. | 362/83.1 |
| 5,497,306 A | 3/1996 | Pastrick | 362/83.1 |
| 5,602,427 A | 2/1997 | Dimitriev | 307/10.8 |
| 5,624,176 A | 4/1997 | O'Farrell et al. | 362/83.1 |
| 5,669,698 A | 9/1997 | Veldman et al. | 362/83.1 |
| 5,669,699 A | 9/1997 | Pastrick et al. | 362/83.1 |
| 5,669,704 A | 9/1997 | Pastrick | 362/83.1 |
| 5,669,705 A | 9/1997 | Pastrick et al. | 362/83.1 |
| 5,823,654 A | 10/1998 | Pastrick et al. | 362/83.1 |
| 5,863,116 A | 1/1999 | Pastrick et al. | 362/494 |
| 5,871,275 A | 2/1999 | O'Farrell | 362/494 |
| 5,879,074 A | 3/1999 | Pastrick | 362/494 |
| 6,074,077 A | 6/1999 | Pastrick et al. | 362/494 |
| 6,007,222 A | 12/1999 | Thau | 362/494 |
| 6,019,475 A | 2/2000 | Lyman et al. | 359/879 |
| 6,086,229 A | 7/2000 | Pastrick | 362/494 |
| 6,099,155 A | 8/2000 | Pastrick et al. | 362/494 |
| 6,124,886 A | 9/2000 | DeLine et al. | 348/148 |
| 6,149,287 A | 11/2000 | Pastrick et al. | 362/494 |
| 6,176,602 B1 | 1/2001 | Pastrick et al. | 362/494 |
| 6,217,181 B1 | 4/2001 | Lynam et al. | 359/879 |
| 6,227,689 B1 | 5/2001 | Miller | 362/494 |

FOREIGN PATENT DOCUMENTS

| | | |
|---|---|---|
| DE | 4219930 A1 | 12/1992 |
| DE | 4130176 A1 | 3/1993 |
| DE | 19520075 A1 | 12/1995 |
| DE | 19520320 C1 | 5/1996 |
| DE | 19613581 A1 | 10/1996 |
| EP | 0716957 A1 | 6/1996 |
| JP | 61188242 | 8/1986 |
| JP | 62218248 | 9/1987 |
| JP | 7186834 | 7/1995 |
| JP | 8156688 | 6/1996 |

MODULAR EXTERIOR REARVIEW MIRROR ASSEMBLY

CROSS REFERENCE TO RELATED APPLICATIONS

This application is a continuation of prior application Ser. No. 09/420,117, filed Oct. 18, 1999, now U.S. Pat. No. 6,146,003, and Ser. No. 08/978,593, filed Nov. 25, 1997, now issued as U.S. Pat. No. 6,007,222.

BACKGROUND OF THE INVENTION

This invention concerns exterior mirrors for vehicles, and especially an exterior mirror including a housing, a mirror or glass support and mirror element or glass body formed in separate modules which are connected to each other by plug type or locking connectors. In addition, the invention relates to the inclusion of energy supply wires or electrical conductors for electrically driven components which are integrated in the modules and/or in the plug type and locking connectors.

Prior known rearview mirror assemblies, and especially exterior rearview mirror assemblies have required the careful assembly of various components in a piece-meal and time consuming fashion. The present invention considerably simplifies the former style of conventional motor vehicle exterior mirrors typically used on passenger cars, vans, or motor trucks. In addition, because the exterior mirror is a vehicle part which projects from the vehicle body and thus forms the extreme lateral extension of a vehicle, the present invention also expands the functionality of the exterior mirror and takes advantage of its position on the vehicle.

SUMMARY OF THE INVENTION

The present invention discloses a housing, a mirror or glass support and a mirror element or glass body for an exterior rearview mirror for vehicles which are separately formed modules linked together by plug type and locking connectors. Consequently, the logistic expense for manufacturing the wide variety and continuously growing diversity of exterior mirrors for varying vehicles is considerably reduced.

In the event the exterior mirror has a built-in, adjustable mechanism or actuator for the mirror or glass element or body, it is preferred that the actuator be included as an additional separate module which can be plugged into or locked with the mirror support and mirror element.

Furthermore, it is preferred to imprint electrical strip conductors on the mirror or glass support and to provide suitable electric contact pins on the actuator mechanism for contact with the strip conductors through connection with the mirror support. A preferred version of the invention provides for integrated electric heating in the mirror glass body module with terminal lugs which make contact with the strip conductors when in connection with the mirror or glass support. Moreover, the housing is preferably made of two separate parts, for example, an upper and lower part which, when assembled, can be locked together enclosing the mirror or glass support. For purposes of good torsional stability, it is also preferred that the mirror or glass support and/or housing parts be in a clam-shell shape. The mirror glass support includes an electric plug type connector whose contacts are connected with the strip conductors at a position close to the mirror base.

In other forms of the invention, a light module is attached to the front exterior mirror. Such a module or light module can encompass particular functions such as turn, stop and position signals, or can be built as a multi-functional element which combines the previously mentioned signals, i.e., incorporates all of these ways of giving signals in a single light module.

In one preferred embodiment of the invention, the housing is composed of a lower and upper parts. The lower part includes as an appropriate support module adapted to the mirror or glass body and/or the mirror or glass support, to the adjustable driving mechanism or actuator for the mirror or glass support and/or mirror or glass body, to the light module, as well as to the housing upper part. The housing lower part includes a support module and, thus, is the module which establishes the connection to and support on the vehicle and the necessary electrical units. Preferably, the housing lower part, on the side closest to the vehicle, has an articulated pivot or link which also includes the appropriate electrical contacts. These can be placed on the lateral forepart of the articulated link or pivot or on its cover or bottom area. Preferably, the electrical contacts are sliding contacts.

In addition, the light module itself is placed on the far side of the housing lower part from the vehicle and is located on the exterior of the housing so that it is flexible and adaptable as a module and not an integrated component. To this end, the housing upper part has a protruding tongue overlapping the light module on the side farthest from the vehicle. From a purely optical point of view, the overall exterior mirror then appears as one single unit. The light module is also provided with necessary electrical contacts such that the light module can be fitted to the housing lower part support module by means of a dovetail joint. The electrical contacts are arranged and shaped on the light module so that they will accommodate or be included in the dovetail joint.

The articulated link or pivot of the housing lower part has a vertical bore or hole for receiving a pivot pin allowing the entire exterior mirror to be rotatable and pivotable. On the side of the housing upper part which is closest to the vehicle, a cap is placed on the articulated link or pivot, or at least partially containing that link or pivot. The cap extends over the articulated link or pivot of the housing lower part. The cap also includes an axial bore or hole, coaxially aligned with the bore hole of the articulated link or pivot so as to create optical unity when viewed from the exterior.

These and other objects, advantages, purposes and features of the invention will become more apparent from a study of the following description taken in conjunction with the drawings.

DESCRIPTION OF THE PREFERRED EMBODIMENTS

Figure 1:
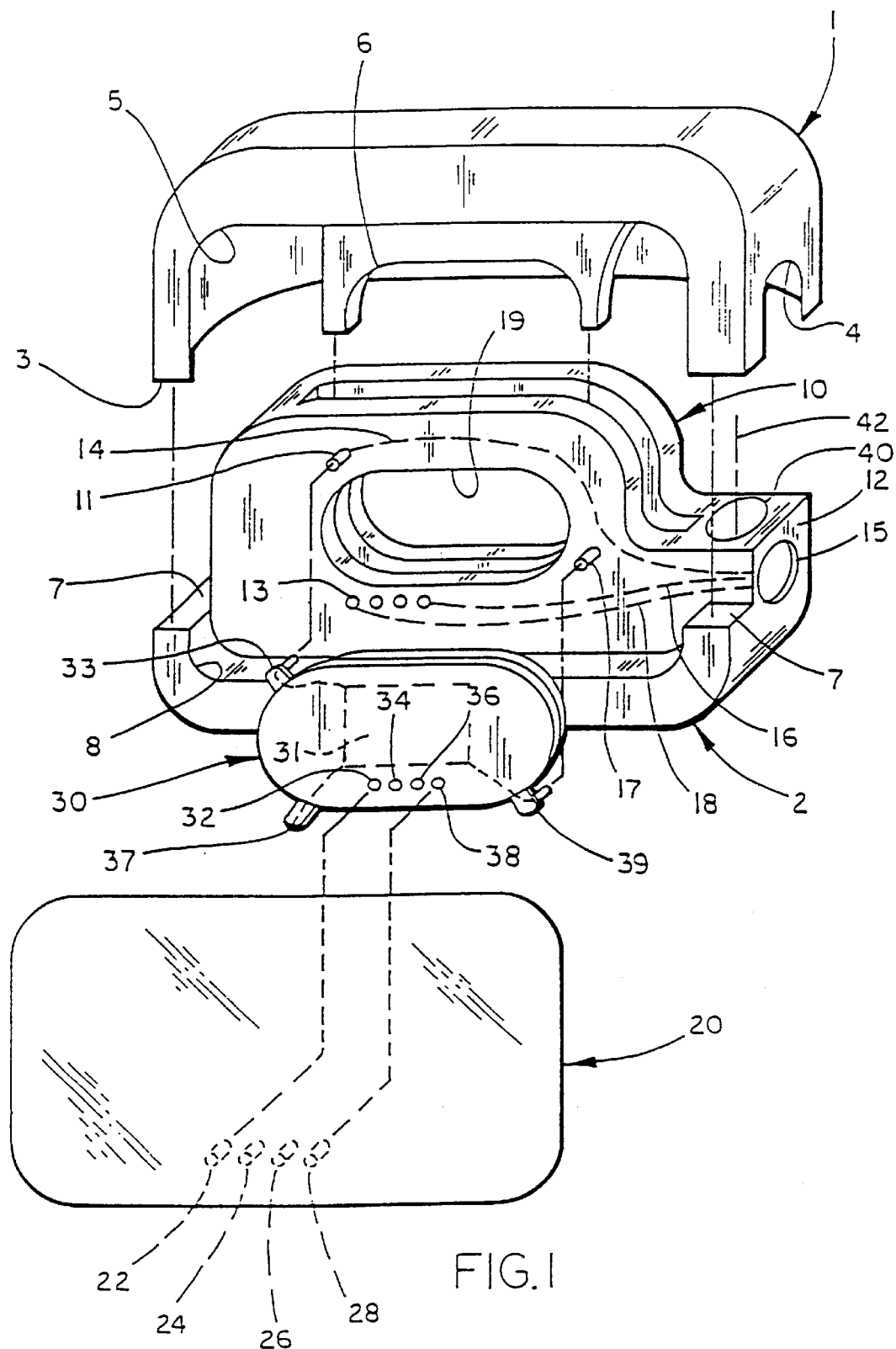
FIG. 1 is an exploded perspective view of the first embodiment of the modular exterior rearview mirror assembly of the present invention.

Referring now to the drawings in greater detail, a first embodiment of the invention is shown in FIG. 1. The housing is composed of an upper part 1 and a lower part 2 made of highly shock resistant synthetic material and designed as a clam shell. Upper part 1 has the shape of a somewhat elongated, reversed U and terminates in a curved lower surface 3 provided with connectors or stop links. On the end facing the position of the vehicle on which the mirror is intended to be mounted, upper part 1 has a roughly circular opening 4 which partially receives the mirror base end extremity of mirror or glass support 10 when assembled. On the rear side with respect to the direction of motion, housing part 1 is provided with a half opening 5 which locks the mirror or glass body 20 in the upper area after assembly. In addition, a fork 6 is shaped from the upper housing part 1, displaced inwardly in relation to the half opening 5, and receives in between an adjustable mechanism or actuator 30 for mirror or glass body 20.

Lower housing part 2 corresponds to the upper housing part 1, resembles a tub, and has an upper periphery 7 which is provided with counterlocking devices or connectors which receive those on the upper part. Thus, upper housing part 1 is locked into place with the lower housing part 2 by means of locking devices provided in areas 3 and 7. On the end closest to the vehicle, lower housing part 2 has an upward opening corresponding to opening 4 such that the base end or near extremity 12 of mirror or glass support 10 is caught between the upper housing part 1 and lower housing part 2 when these are connected. Lower housing part 2, like upper housing part 1, is made of highly shock resistant synthetic material and is also designed as a clam shell. Edge 5 of upper housing part 1 blends into edge 8 of lower housing part 2 encompassing the mirror or glass body 20 from below after assembly.

Mirror or glass support 10 is also made of strong, synthetic material and designed as a clam shell showing the shape of a kind of hollow plate. Through appropriate shapes in the interior of the upper housing part and lower housing parts, mirror or glass support 10 is contained inside the space surrounded by housing parts 1 and 2. Several electric strip conductors 14, 16, 18 are imprinted on the synthetic material of mirror or glass support 10. These are electrically connected with pins of a tip jack 15 provided in the extremity 12 of mirror support 10. Each strip connector ends in a jack 11, 13, 17 shaped in the material of the glass support, each having an electric conductive strip inside. Furthermore, mirror support 10 has a central, somewhat elliptical opening 19 into which the appropriately shaped adjustable mechanism or actuator 30 for mirror or glass support 20 can be inserted and locked. The actuator has a somewhat elliptical housing receiving the electric regulating motors 31 for mirror or glass body 20. The electrical connections of the driving motors are linked with contact pins 33, 37, 39 protruding sideways from the body of the actuator 30 such that, when assembling the actuator, they reach the openings in jacks 11, 13, 17 where they make an electrical connection with strip conductors 14, 16, 18.

When the mirror or glass body is provided with integrated heating and/or is composed of an electrochromic mirror, electric contact pins 22, 24, 26, 28 are lined up side-by-side on the back of the mirror or glass body. These are locked in jacks 32, 34, 36, 38 on the front side of the housing of the adjustable mechanism or actuator 30. Each of these jacks 32, 34, 36, 38 contains an electric contact, which either leads to an additional connection on each contact pin 33, 37 or 39 or is looped through the housing of actuator 30 and makes contact with the same existing strip contactors when positioning the actuator housing in opening 19.

The base side extremity of glass support 10 is vertically drilled for insertion of a pivot pin through bore hole 40, whereby the folding and swiveling or pivoting axis 42 for the mirror subassembly, in relation to the mirror base, extends along the centerline of the bore hole 40.

Figure 2:
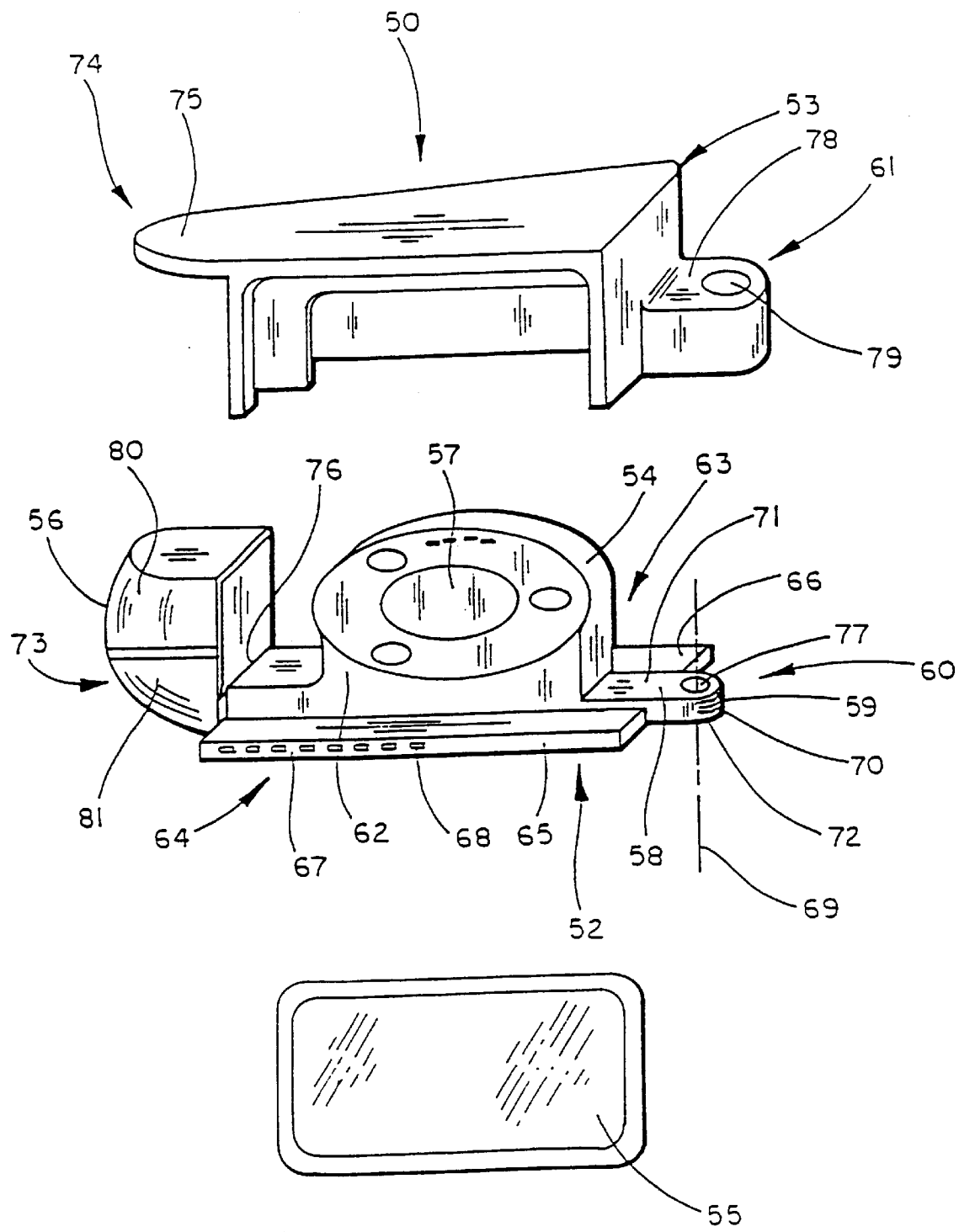
FIG. 2 is an exploded perspective view of a second embodiment of the modular exterior rearview mirror assembly of the present invention.

A second embodiment 50 of the exterior rearview mirror assembly is shown in FIG. 2. A housing lower part 52 forms the actual support module for all other adaptable modules well as housing upper part 53. Housing lower part 52 includes a saddle part 62 on which is arranged, for example, adjustable driving mechanism or actuator 57 or mirror glass support 54 for the adjustment of the position of mirror or glass body 55. On side 63 of saddle part 62, facing the direction of oncoming traffic, and on side 64 facing the rear side which is opposite the oncoming traffic direction, shaped brackets 65 and 66 are provided on which housing upper part 53 partially rests. Brackets 65 and 66 can also be part of light module 56. Brackets 65 and 66 are not overlapped by housing upper part 53 such that bracket 65, for example, has on its forepart 67 a useful arrangement of signal giving light emitting diodes (LEDs) 68. Light module 56 is placed on end 73 of the housing lower part 52 which is farthest from the vehicle. In order to insure electrical flow, light module 56 consists of contacts 76 schematically represented in FIG. 2, which are connected with appropriate counter contacts of housing lower part 52 designed as the support module. All types of connections assuring a simple and easy assembly should be considered. On end 60 of housing lower part 52 which is designed as the support module, a protruding articulated link 58 is provided at the side of saddle part 62. Since housing lower part 52 establishes the actual connection with the vehicle, the appropriate electrical contacts 59 must also be provided here. For example, they can be located on the cover side 71, bottom area 72, or the lateral forepart 70 of articulated link 58.

For practical reasons, contacts 59 are made as sliding contacts. In order to receive a pin, articulated link 58 is provided with a bore hole 77 through which runs a pivot axis 69. Housing upper part 53 fits the lower housing part 52, at least partially, in a saucer-type configuration. On end 61 closest to the vehicle, a cap shape 78 extends over articulated link or pivot 58 of housing lower part 52. In the cap, an axial bore hole 79 is provided which fits coaxially with bore hole 77 of articulated link 58. On end 74 farthest from the vehicle, a protruding tongue 75 extending to the light module 56 juts out from the housing main part. Light module 56 can be subdivided into various signal sectors 80, 81 as represented in FIG. 2.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. An exterior rearview mirror system for a vehicle comprising:
   an exterior rearview mirror assembly comprising a plurality of modules, said plurality of modules including at least two modules selected from the group consisting of a mirror element, a housing, a mirror support, an actuator and a light module; and
   wherein said plurality of modules is joined together by plug-type connectors;
   at least one of said plurality of modules comprising an electrically powered module wherein electricity is provided to said electrically powered module when said electrically powered module is joined together with another module of said plurality of modules;

said electrically powered module comprising a heated mirror element.

2. The exterior rearview mirror system according to claim 1, wherein said another module comprises an actuator.

3. The exterior rearview mirror system according to claim 1, wherein said heated mirror element comprises a heated electrochromic mirror element.

4. An exterior rearview mirror system for a vehicle comprising:

A an exterior rearview mirror assembly comprising a plurality of modules, said plurality of modules including at least two modules selected from the group consisting of a mirror element, a housing, a mirror support, an actuator and a light module; and wherein said plurality of modules is joined together by plug-type connectors;

said assembly including a pivot joint, said pivot joint including at least one electric contact.

5. The exterior rearview mirror system according to claim 4, wherein said at least one electric contact comprises a sliding contact.

6. An exterior rearview mirror system for a vehicle comprising:

an exterior rearview mirror assembly comprising a plurality of modules, said plurality of modules including at least two modules selected from the group consisting of a mirror element, a housing, a mirror support, an actuator and a light module; and wherein said plurality of modules is joined together by plug-type connectors;

said plurality of modules comprising a mirror element and a housing, said housing including an upper part and a lower part.

7. The exterior rearview mirror system according to claim 6, wherein said plurality of modules further comprises a mirror support.

8. The exterior rearview mirror system according to claim 7, wherein each of said upper and lower parts has an exterior wall defining a shell having a rim for partially enclosing said mirror support and said mirror element, said rim exposing said mirror element for viewing.

9. The exterior rearview mirror system according to claim 8, wherein said shell on each of said upper and lower parts terminates in contact surfaces, said contact surfaces corresponding with and engaging one another and forming a joint at which said upper and lower parts are joined together, said shells combining to form an exterior surface on one side of said assembly, and an opening exposing said mirror element for viewing on the side of said assembly opposite said one side when said upper and lower parts are joined at said contact surfaces.

10. An exterior rearview mirror system for a vehicle comprising:

an exterior rearview mirror assembly comprising a plurality of modules, said plurality of modules including at least two modules selected from the group consisting of a mirror element, a housing, a mirror support, an actuator and a light module; and wherein said plurality of modules is joined together by plug-type connectors;

said plurality of modules comprising a mirror element and an actuator.

11. The exterior rearview mirror system according to claim 10, wherein said actuator comprises an electrical actuator having at least one motor which adjusts the position of said mirror element.

12. An exterior rearview mirror system for a vehicle comprising:

an exterior rearview mirror assembly comprising a plurality of modules, said plurality of modules including at least two modules selected from the group consisting of a mirror element, a housing, a mirror support, an actuator and a light module; and wherein said plurality of modules is joined together by plug-type connectors;

said plurality of modules comprising a mirror support and an actuator, said actuator mounted on said mirror support.

13. The exterior rearview mirror system according to claim 12, wherein said actuator and said mirror support include plug and socket connections for locking said actuator on said mirror support.

14. The exterior rearview mirror system according to claim 13, wherein said mirror support includes electrical conductors for connecting said actuator to a source of electrical power, said electrical conductors being connected to said actuator through said plug and socket connections.

15. The exterior rearview mirror system according to claim 14, wherein said mirror assembly includes a connection for mounting said assembly to the vehicle, said connection including a pivot.

16. The exterior rearview mirror system according to claim 10, wherein said mirror element is selected from the group consisting of a heated mirror element and an electrochromic mirror element, said mirror support including electrical conductors for connecting said actuator to a source of electrical power, said mirror element and said actuator including plug and socket electrical connections whereby electrical connections are established from said electrical conductors on said mirror support to said mirror element through said actuator.

17. An exterior rearview mirror system for a vehicle comprising:

an exterior rearview mirror assembly comprising a plurality of modules, said plurality of modules including at least two modules selected from the group consisting of a mirror element, a housing, a mirror support, an actuator and a light module; and wherein said plurality of modules is joined together by plug-type connectors;

said plurality of modules comprises a mirror support, said mirror support including an opening therein.

18. The exterior rearview mirror system according to claim 17, wherein an actuator is mounted in said opening.

19. An exterior rearview mirror system for a vehicle comprising:

an exterior rearview mirror assembly comprising a plurality of modules, said plurality of modules including at least two modules selected from the group consisting of a mirror element, a housing, a mirror support, an actuator and a light modules: and wherein said plurality of modules is joined together by plug-type connectors;

said plurality of modules comprises a mirror support, and including a light module mounted on said mirror support.

20. The exterior rearview mirror system according to claim 19, including electrical conductors for conducting electricity to said light module.

21. An exterior rearview mirror system for a vehicle comprising:

an exterior rearview mirror assembly comprising a plurality of modules, at least one of said plurality of modules comprising an electrically powered module;

said plurality of modules joining together by plug-type connectors; and wherein electricity is provided to said electrically powered module when said electrically powered module is joined together with another module of said plurality of modules;

at least two modules being selected from the group consisting of a mirror element, a mirror support, and an actuator.

22. An exterior rearview mirror system for a vehicle comprising:

an exterior rearview mirror assembly comprising a plurality of modules, at least one of said plurality of modules comprising an electrically powered module;

said plurality of modules joining together by plug-type connectors; and wherein electricity is provided to said electrically powered module when said electrically powered module is joined together with another module of said plurality of modules;

said electrically powered module comprising a heated mirror element.

23. The exterior rearview mirror system according to claim 22, wherein said another module comprises an actuator.

24. The exterior rearview mirror system according to claim 22, wherein said heated mirror element comprises a heated electrochromic mirror element.

25. An exterior rearview mirror system for a vehicle comprising:

an exterior rearview mirror assembly comprising a plurality of modules, at least one of said plurality of modules comprising an electrically powered module;

said plurality of modules joining together by plug-type connectors; and wherein electricity is provided to said electrically powered module when said electrically powered module is joined together with another module of said plurality of modules;

said assembly including a pivot joint, said pivot joint including at least one electric contact.

26. The exterior rearview mirror system according to claim 25, wherein said at least one electric contract comprises a sliding contract.

27. An exterior rearview mirror system for a vehicle comprising:

an exterior rearview mirror assembly comprising a plurality of modules, at least one of said plurality of modules comprising an electrically powered module;

said plurality of modules joining together by plug-type connectors; and wherein electricity is provided to said electrically powered module when said electrically powered module is joined together with another module of said plurality of modules;

said plurality of modules comprising a mirror element and a housing.

28. The exterior rearview mirror system according to claim 27, wherein said housing includes an upper part and a lower part.

29. The exterior rearview mirror system according to claim 27, wherein said housing includes a connection for mounting said assembly on the vehicle.

30. The exterior rearview mirror system according to claim 28, wherein said plurality of modules further comprises a mirror support.

31. The exterior rearview mirror system according to claim 30, wherein each of said upper and lower parts has an exterior wall defining a shell having a rim for partially enclosing said mirror support and said mirror element, said rim exposing said mirror element for viewing.

32. The exterior rearview mirror system according to claim 31, wherein said shell on each of said upper and lower parts terminates in contact surfaces, said contact surfaces corresponding with and engaging one another and forming a joint at which said upper and lower parts are joined together, said shells combining to form an exterior surface on one side of said assembly, and an opening exposing said mirror element for viewing on the side of said assembly opposite said one side when said upper and lower parts are joined at said contact surfaces.

33. An exterior rearview mirror system for a vehicle comprising:

an exterior rearview mirror assembly comprising a plurality of modules, at least one of said plurality of modules comprising an electrically powered module;

said plurality of modules joining together by plug-type connectors; and wherein electricity is provided to said electrically powered module when said electrically powered module is joined together with another module of said plurality of modules;

said plurality of modules composing a mirror element and an actuator.

34. The exterior rearview mirror system according to claim 33, wherein said actuator comprises an electrical actuator having at least one motor which adjusts the position of said mirror element.

35. An exterior rearview mirror system for a vehicle comprising:

an exterior rearview mirror assembly comprising a plurality of modules, at least one of said plurality of modules comprising an electrically powered module;

said plurality of modules joining together by plug-type connectors, and wherein electricity is provided to said electrically powered module when said electrically powered module is joined together with another module of said plurality of modules;

said plurality of modules comprising a mirror support and an actuator, said actuator mounted on said mirror support.

36. The exterior rearview mirror system according to claim 35, wherein said actuator and said mirror support include plug and socket connections for locking said actuator on said mirror support.

37. The exterior rearview mirror system according to claim 36, wherein said mirror support includes electrical conductors for connecting said actuator to a source of electrical power, said electrical conductors being connected to said actuator through said plug and socket connections.

38. The exterior rearview mirror system according to claim 36, wherein said mirror assembly includes a connection for mounting said assembly to the vehicle, said connection including a pivot.

39. The exterior rearview mirror system according to claim 33, wherein said mirror element is selected from the group consisting of a heated mirror element and an electrochromic mirror element; said plurality of modules further comprising a mirror support, said mirror support including electrical conductors for connecting said actuator to a source of electrical power, said mirror element and said actuator including plug and socket electrical connections whereby electrical connections are established from said electrical conductors on said mirror support to said mirror element through said actuator.

40. An exterior rearview mirror system for a vehicle comprising:
   an exterior rearview mirror assembly comprising a plurality of modules, at least one of said plurality of modules comprising an electrically powered module;
   said plurality of modules joining together by plug-type connectors; and
   wherein electricity is provided to said electrically powered module when said electrically powered module is joined together with another module of said plurality of modules;
   said plurality of modules comprising a mirror support.

41. The exterior rearview mirror system according to claim 40, wherein said mirror support includes an opening therein.

42. The exterior rearview mirror system according to claim 41, wherein an actuator is mounted in said opening.

43. The exterior rearview mirror system according to claim 40, including a light module mounted on said mirror support.

44. The exterior rearview mirror system according to claim 43, including electrical conductors for conducting electricity to said light module.

45. An exterior rearview mirror system for a vehicle comprising:
   an exterior rearview mirror assembly comprising a mirror support, a mirror element and an actuator;
   said actuator comprising an electrical actuator having at least one motor which adjusts the position of said mirror element;
   said actuator mounted to said mirror support by plug and socket connections; and
   wherein said assembly includes electrical conductors for connecting said actuator to a source of electrical power, said electrical conductors being connected to said actuator through said plug and socket connections.

46. The exterior rearview mirror system according to claim 45, including at least one of a housing and a light module.

47. The exterior rearview mirror system according to claim 45 wherein said mirror element comprises a heated mirror element.

48. The exterior rearview mirror system according to claim 47, wherein said heated mirror element comprises a heated electrochromic mirror element.

49. The exterior rearview mirror system according to claim 45, wherein said assembly includes a pivot joint.

50. The exterior rearview mirror system according to claim 49, wherein said pivot joint includes at least one electric contact.

51. The exterior rearview mirror system according to claim 50, wherein said at least one electric contact comprises a sliding contact.

52. The exterior rearview mirror system according to claim 45, including a housing and wherein said housing includes an upper part and a lower part.

53. The exterior rearview mirror system according to claim 52, wherein said housing includes a connection for mounting said assembly on the vehicle.

54. The exterior rearview mirror system according to claim 53, wherein each of said upper and lower parts has an exterior wall defining a shell having a rim for partially enclosing said mirror support and said mirror element, said rim exposing said mirror element for viewing.

55. The exterior rearview mirror system according to claim 54, wherein said shell on each of said upper and lower parts terminates in contact surfaces, said contact surfaces corresponding with and engaging one another and forming a joint at which said upper and lower parts are joined together, said shells combining to form an exterior surface on one side of said assembly, and an opening exposing said mirror element for viewing on the side of said assembly opposite said one side when said upper and lower parts are joined at said contact surfaces.

56. The exterior rearview mirror system according to claim 45, wherein said mirror element is selected from the group consisting of a heated mirror element and an electrochromic mirror element, said mirror support including electrical conductors for connecting said actuator to a source of electrical power, said mirror element and said actuator including plug and socket electrical connections whereby electrical connections are established from said electrical conductors on said mirror support to said mirror element through said actuator.

57. The exterior rearview mirror system according to claim 45, wherein said mirror support includes an opening therein.

58. The exterior rearview mirror system according to claim 57, wherein an actuator is mounted in said opening.

59. The exterior rearview mirror system according to claim 45, including a light module mounted on said mirror support.

60. The exterior rearview mirror system according to claim 59, including electrical conductors for conducting electricity to said light module.

* * * * *

UNITED STATES PATENT AND TRADEMARK OFFICE
CERTIFICATE OF CORRECTION

PATENT NO. : 6,336,737 B1
DATED : January 8, 2002
INVENTOR(S) : Thau

It is certified that error appears in the above-identified patent and that said Letters Patent is hereby corrected as shown below:

<u>Title page,</u>
Item [57], ABSTRACT,
Line 7, "a" should be -- at --.

<u>Column 4,</u>
Line 4, insert -- as -- before "well".

<u>Column 5,</u>
Line 10, delete "A" (first occurrence) before "an".

<u>Column 6,</u>
Line 54, "modules:" should be -- module; --.

<u>Column 7,</u>
Line 44, "contract" should be -- contact --.
Line 45, "contract" should be -- contact --.

<u>Column 8,</u>
Line 27, "composing" should be -- comprising --.

Signed and Sealed this

Tenth Day of February, 2004

JON W. DUDAS
*Acting Director of the United States Patent and Trademark Office*